(12) United States Patent
Barry

(10) Patent No.: US 6,325,156 B1
(45) Date of Patent: Dec. 4, 2001

(54) GAUGE WHEEL AND COULTER ARRANGEMENT FOR AGRICULTURAL IMPLEMENT

(75) Inventor: Alan F. Barry, Fairfax, IA (US)

(73) Assignee: Kinze Manufacturing, Inc.

( * ) Notice: Subject to any disclaimer, the term of this patent is extended or adjusted under 35 U.S.C. 154(b) by 0 days.

(21) Appl. No.: 09/513,804

(22) Filed: Feb. 25, 2000

Related U.S. Application Data

(60) Provisional application No. 60/121,859, filed on Feb. 26, 1999.

(51) Int. Cl.$^7$ .................................................. A01B 49/04
(52) U.S. Cl. ......................... 172/518; 172/536; 111/135
(58) Field of Search ...................... 172/518, 519, 172/536; 111/52, 62, 134, 135, 144, 149, 163, 164

(56) References Cited

U.S. PATENT DOCUMENTS

| | | | |
|---|---|---|---|
| 4,423,788 | * | 1/1984 | Robinson, Jr. et al. ............. 172/536 |
| 4,493,274 | * | 1/1985 | Robinson, Jr. et al. ............. 172/536 |
| 4,785,890 | * | 11/1988 | Martin ..................................... 111/52 |
| 5,333,559 | * | 8/1994 | Hodapp et al. ...................... 111/152 |
| 5,461,995 | * | 10/1995 | Winterton .............................. 111/52 |
| 5,573,072 | * | 11/1996 | Evans et al. .......................... 172/744 |
| 5,619,939 | * | 4/1997 | Herman et al. ....................... 111/163 |
| 5,704,430 | * | 1/1998 | Smith et al. ............................ 172/29 |

* cited by examiner

Primary Examiner—Thomas B. Will
Assistant Examiner—Nathan Mammen
(74) Attorney, Agent, or Firm—Emrich & Dithmar

(57) ABSTRACT

A gauge wheel/coulter arrangement for an agricultural row unit. A pair of closely spaced, narrow, ground-engaging wheels in side-by-side relation are mounted to rotate about intersecting axes. Specifically, the wheels are angled inwardly toward each other at the forward and lower portions of the wheels so that adjacent edges of the wheels firmly engage each other to cause the wheels to rotate in unison when drawn through a field. The region of contact between the wheels extends from a point at or below the horizontal center lines of the two wheels, downwardly and rearwardly to a point adjacent where the two wheels engage the ground. A coulter is located between the gauge wheels and bisects the angle between them. The gauge wheels engage and pin down the crop residue while the coulter cuts the residue as it is held in place and tensioned by the passing, diverging gauge wheels. The angled gauge wheels in firm contact with each other in the lower front quadrant provide a narrow, wedge-shaped front profile to avoid row crop damage, and a continuous wall to ride over residue being traversed by the wheels.

10 Claims, 5 Drawing Sheets

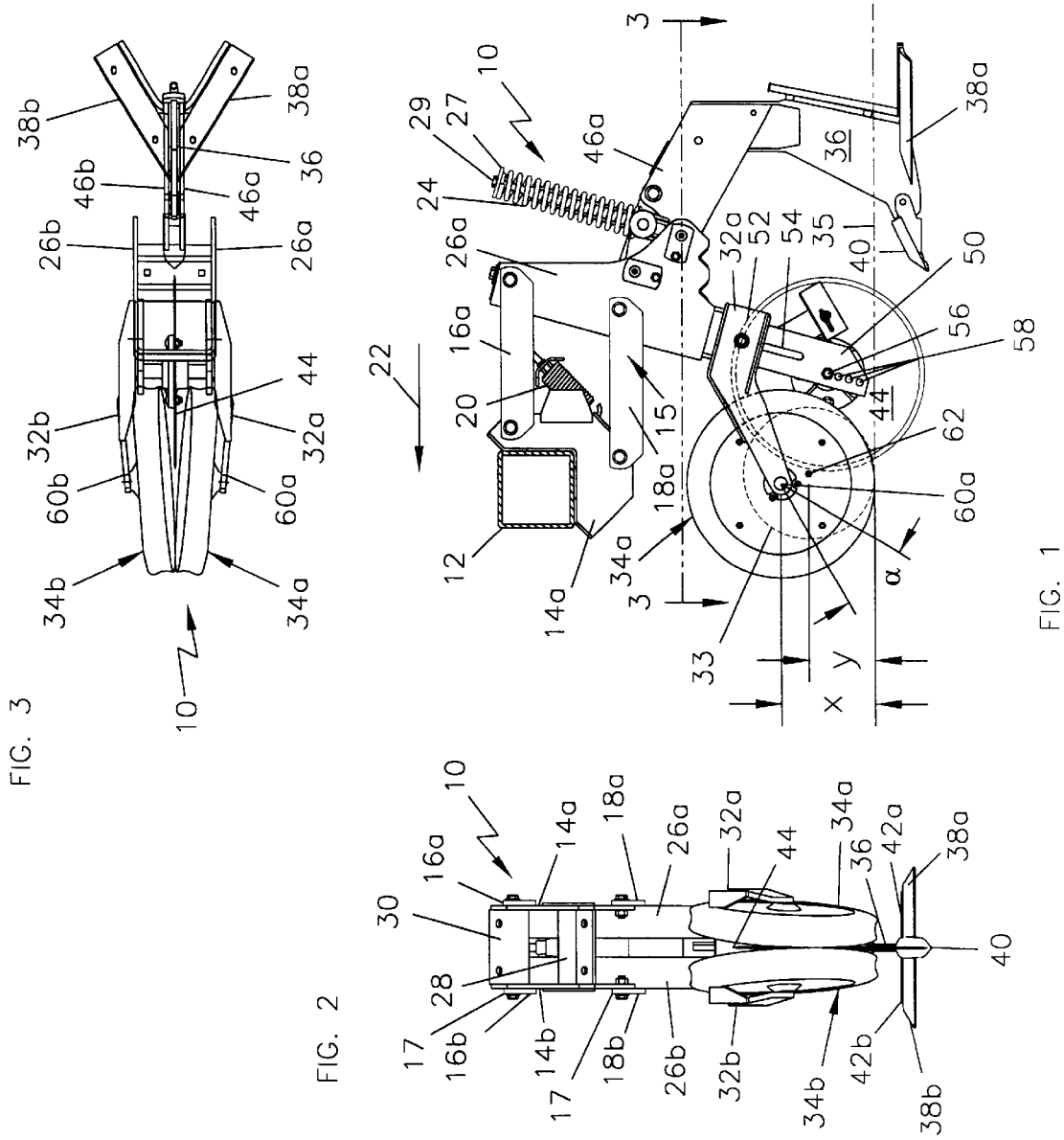

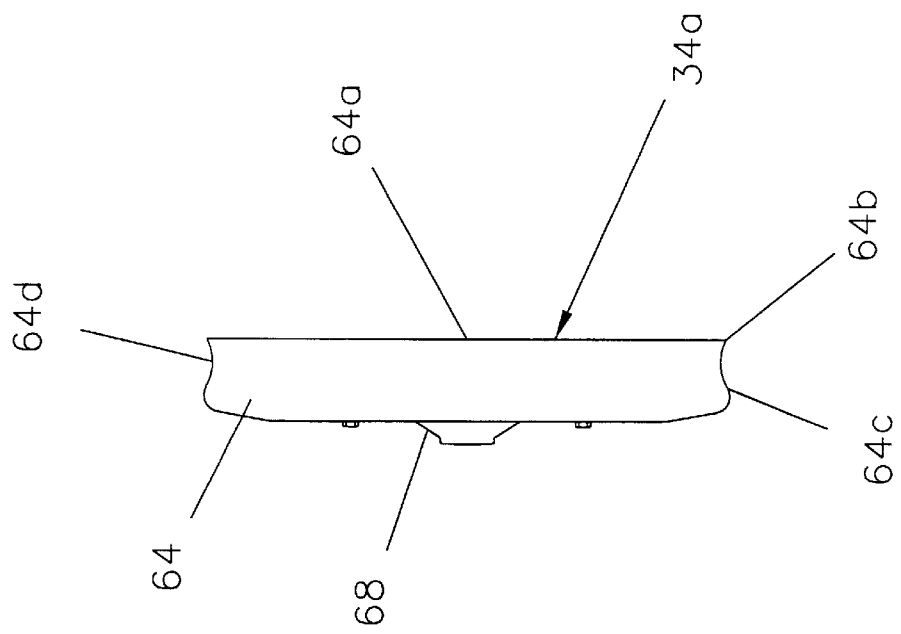
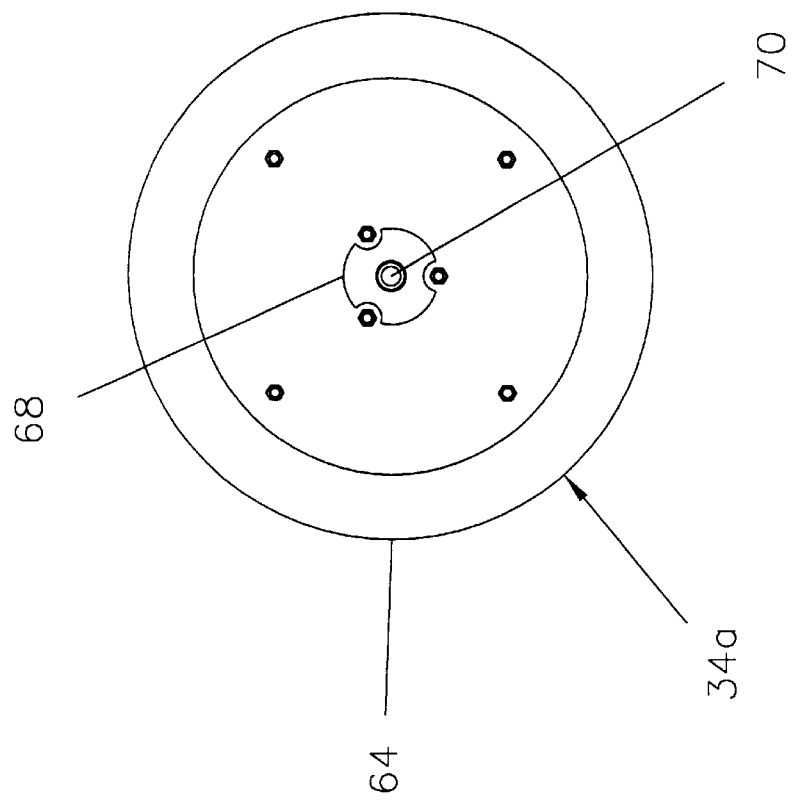
FIG. 5
FIG. 4

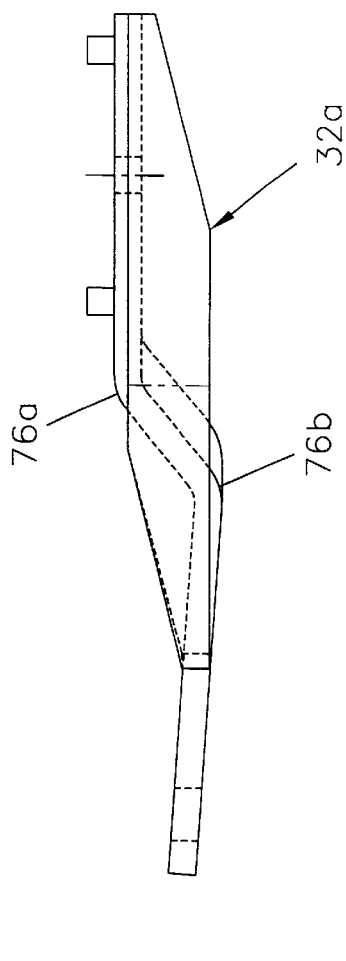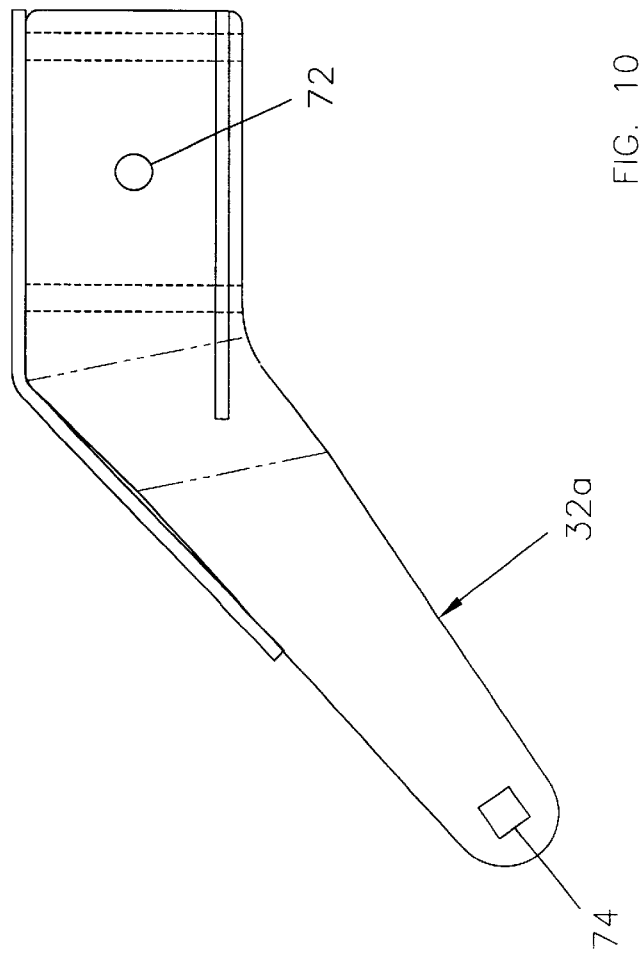

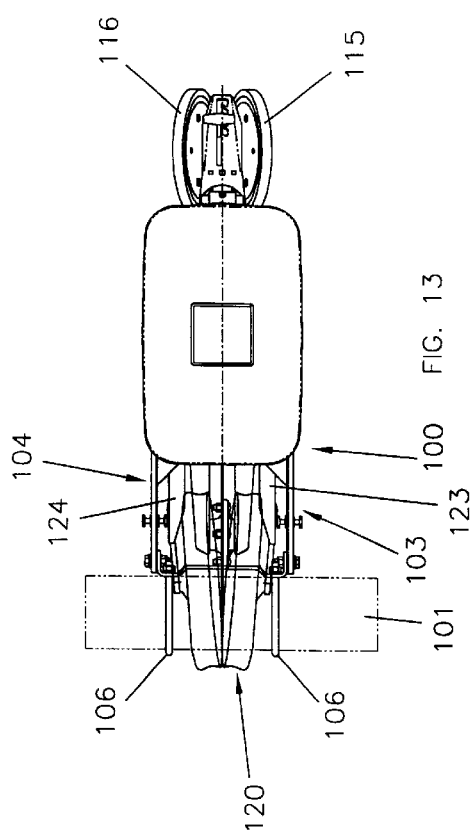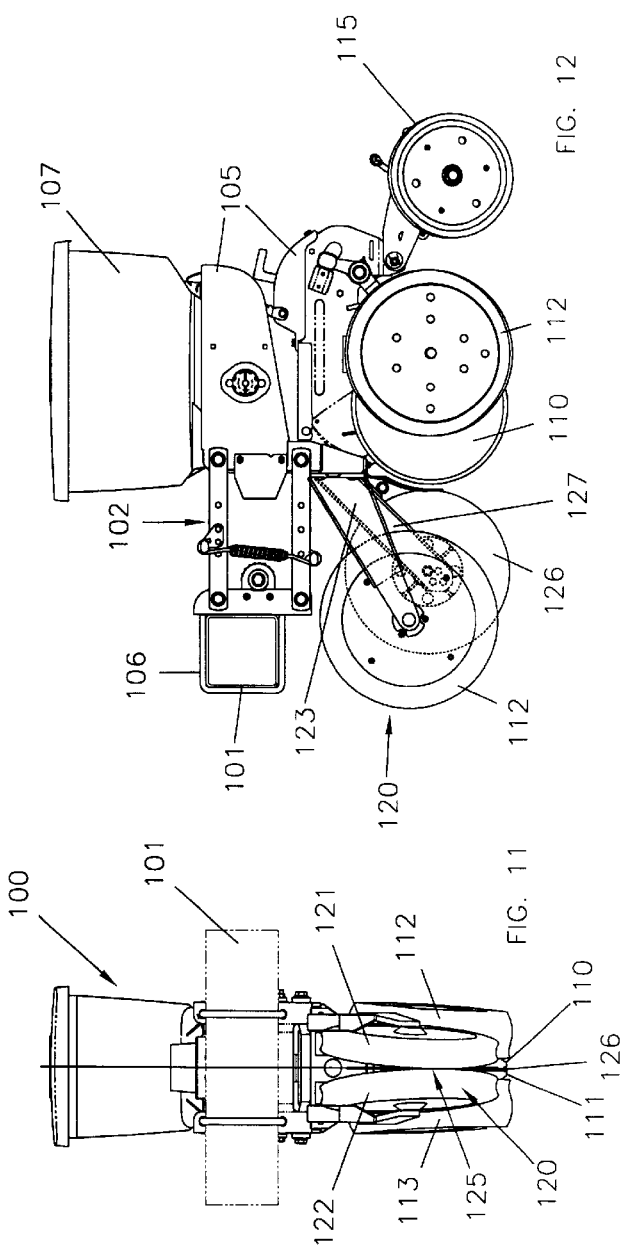

GAUGE WHEEL AND COULTER ARRANGEMENT FOR AGRICULTURAL IMPLEMENT

RELATED APPLICATION

This application claims the benefit of the filing date of copending U.S. Provisional Application No. 60/121,859, filed Feb. 26, 1999.

FIELD OF THE INVENTION

This invention relates generally to agricultural implements and is particularly directed to a depth gauge wheel and coulter arrangement for use with an agricultural implement having individual row units, such as cultivators, planters, anhydrous ammonia applicators, fertilizers openers, fertilizer side dress openers and others.

BACKGROUND OF THE INVENTION

Many important crops, such as corn and soybeans, are planted in rows of substantial and uniform spacing, as distinguished from crops which are planted by a broadcast method or other crops which are planted in rows so narrow that upon emergence and growth, the crop effectively covers the surface of the soil and is neither cultivated nor harvested in rows. Implements for planting, cultivating and fertilizing row crops are thus typically designed so that the working tools, whether they engage the ground (as in planters and cultivators) or not (as in sprayers), are laterally spaced along a frame or toolbar at the same spacing as the crop rows are spaced. Depending on the type of implement, there may be one or more ground-engaging tools associated with each crop row; and the tools for each row are normally mounted on a separate device called a "row unit." A row unit, if it includes ground-engaging tools, normally has its own support wheels and is mounted to the toolbar by means of a four-bar linkage or equivalent which allows each row unit to move vertically to adjust to the contour of the ground independently of the other row units on the same toolbar. For those row units which do have ground-engaging tools, there typically is a need to gauge the depth of working. This is normally done by supporting the row unit with support wheels which are referred to as depth gauge wheels or, simply, gauge wheels.

Thus, gauge wheels are used to support the row units of a drawn agricultural implement to establish the operating depth of a ground-engaging tool carried by the row unit. The gauge wheels are disposed on and travel over the surface of the soil. The ground-engaging tool operates at a depth lower than the ground-engaging surface of the gauge wheels by a predetermined distance. One task typically performed by row units for cultivators, planters, fertilizer applicators and other implements designed for operation in high residue fields involves the cutting of crop residue, vines and weeds (generally referred to as "residue") between adjacent crop rows to permit the cultivator sweep, in that case, to cut growing weeds without being plugged up with residue, or to part the residue for furrow formation in the case of a planter. The present invention is disclosed principally in the context of a cultivator row unit in FIGS. 1–10. It is also shown in a planter row unit in FIGS. 11–13; but persons skilled in the art will recognize that the invention is equally well suited for use with fertilizer applicators and other agricultural implements designed for use in environments having high surface residue and is not necessarily limited to row units. For example, it may be adapted to fertilizer applicators, either particulate or anhydrous ammonia.

There are two different approaches currently practiced for gauging coulter depth in implements of the type with which the present invention is concerned. One type uses a single wheel placed directly in front of the coulter. This approach has the advantages that a wheel of larger diameter may be used to provide better flotation (sometimes referred to as having a larger "rolling diameter"), and, for the same flotation (or weight-bearing capacity without substantially compacting the soil), the width of the tire may be narrower. A narrower width has the advantage that the wheel is less likely to contact adjacent tender crop or pass over crop root, either of which may cause damage. Further, a narrow front profile provides a better fit in the swales between rows in ridge farming.

The disadvantage of the single forward wheel system is that the cutting action of the coulter is less effective than a two-wheel system in which the wheels are placed rearward to straddle the coulter. An object of the two-wheel system is to place the tires adjacent the location at which the coulter enters the soil and begins to cut the residue. The wheels hold and tension the residue while the coulter cuts it. Typical two-wheel systems are seen in U.S. Pat. No. 2,440,174 (Howard) and U.S. Pat. No. 4,834,189 (Peterson et al.).

In the two-wheel system, the wheels must be placed in a diverging relation by mounting the wheels on separate axles. That is, the wheels are closer together toward the front and below the horizontal plane passing through the center of the wheels (referred to as the lower front quadrant). From that point, the wheels diverge upwardly and rearwardly in order to provide space to receive the coulter blade. In other words, the wheels have intersecting axes of rotation. In the two-wheel approach, there are important design trade-offs or compromises which must be made.

First, the larger the diameter of the wheels, the greater will be the tendency of the wheels to interfere with the hub mounting the coulter. Further, increasing the angle of divergence of the wheels (to provide space for the coulter blade) for a given wheel diameter, desirably permits the coulter to be moved forward which provides a cutting advantage, but at the same time, the amount of divergence, the diameter of the wheels and the width of the wheels all contribute to the overall maximum operating width of the wheels. The maximum operating width, on the other hand, is limited by the spacing of crop on adjacent rows. Thus, as a practical matter, in the two-wheel system, the width of the wheels is reduced (resulting in reduced flotation); the diameter of the wheels is reduced (also reducing flotation) to avoid interference with the coulter hub and permit the coulter blade to be positioned further forward; and the coulter is not located as far forward as desired (to reduce the angle of divergence, and thus the maximum width of the wheels).

Nevertheless, the performance of the two-wheel system is generally preferred over the one-wheel system, and it is generally practiced in cultivator row units.

To summarize the disadvantages with existing two-wheel systems, if an unskilled operator drives the tractor, there might be some crop damage due to the maximum width of the gauge wheel arrangement and the tight tolerances with crop row spacing. If the field is a "no-till" or heavy residue field, there might be insufficient cutting of stalks, vines and tougher, less-decayed residue because the gauge wheels are not located at the exact location where the coulter enters the soil and begins cutting. It is at this location that the gauge wheels should ideally be placed because that is where the wheels can best hold (and even tension if the wheels are slightly toed inwardly) the residue as the coulter cuts it.

Further, as accessories are added to the row unit, the weight increases; and the wheels, due to their smaller diameter, have a tendency to compact the soil and form a groove or furrow in soft or wet soil. Water then drains and collects in the grooves, drawing the water away from the crop root, where it is desired. In the prior art, the gauge wheels are separated in the lower front quadrant. The space between them permits residue to pass between the wheels and be gathered and dragged by the assembly. Dragging the residue with the cultivator also tends to plug the trailing cultivator sweep, thus reducing its effectiveness.

The present invention addresses these limitations of the prior art by providing a gauge wheel arrangement particularly adapted for use in a cultivator row unit (but equally useful, for example, in a planter operating in high residue and other implements) wherein the row units are mounted to a toolbar for independent vertical motion, as conventionally done. This permits each row unit to adjust to uneven ground contour, but requires depth gauging at each row unit.

According to the invention, a pair of side-by-side gauge wheels are mounted on intersecting axes, inclined (or toed) inwardly toward each other such that they engage each other at a forward location below a plane passing through the center of the wheels and above the location at which the wheels engage the soil (i.e., the lower front quadrant of the wheels). The axes extend slightly upwardly and rearwardly proceeding from the outside to the center of the unit. The gauge wheels, thus inclined, are placed close together to engage each other as described and to diverge as one proceeds up and to the rear. Further, the wheels are preferably semi-pneumatic tires, not inflated, to provide a large footprint for improved row unit support. The spacing between the diverging gauge wheels at the rear permits a trailing coulter to be placed in a more forward position to improve cutting of crop residue, vines and weeds because, even with gauge wheels of larger diameter (e.g., 12 inches or larger), the wheels engage and secure the residue at the location where the coulter enters the ground to cut the residue.

As indicated, the wheels are arranged to contact each other at a location forward and above the point at which the gauge wheels contact the ground. For example, when viewed from the left side (i.e., the left side of one looking in the direction of forward travel), the gauge wheels engage the soil slightly before and aft of the six o'clock position, and their inner edges firmly contact each other over an arc defined by an angle of approximately 30–60° centered at approximately midway between the seven-eight o'clock position, that is, in the lower front quadrant of the wheels. By firmly contacting each other, it is meant that the wheels are forced together during assembly so that the semi-pneumatic tires deform slightly to form a solid profile or wall. This enables the combined wheels, even though comparatively narrow individually, to roll over mounds of residue. It also prevents crop leaves from entering between the wheels and being pinched off or otherwise damaged. The wheels diverge from one another as one proceeds from the contact area through the point at which the axes of rotation of the gauge wheels intersect, and then to the one-two o'clock position, where the divergence of the gauge wheel tires is at its maximum to receive the coulter mounting arm and hub.

Further, the diameter of the gauge wheels may be made larger (increased, for example, from 12 inches to 16 inches in the case of an 18 inches diameter coulter). The larger diameter gauge wheels have greater flotation which permits the gauge wheels to have a narrower width for the same flotation or weight-carrying ability, as the smaller diameter wheels. This divergence or rear opening of the gauge wheels combined with the narrower width of the gauge wheels permits the gauge wheels to be placed more toward the rear relative to the coulter (conversely, as stated, the coulter may be moved forward). Moreover, because the wheels are narrower, the gauge wheels may be spaced further apart to straddle the coulter hub, and still present a substantially narrower overall width than the wider, smaller diameter wheels of prior units. This results in a lesser tendency to interfere with the crop, or to form furrows because of the large diameter and cooperative effect of placing the two wheels together where they begin to engage the ground.

Further, the wedge-shaped, solid front profile for the inventive gauge wheel arrangement permits the unit to pass between crop rows while brushing crop to the side, as opposed to running over the crop when the unit gets too close to the crop. And the diverging arrangement of the wheels tensions residue trapped beneath both wheels as the wheels pass over the residue. This makes the cutting more effective.

OBJECTS AND SUMMARY OF THE INVENTION

Accordingly, it is an object of the present invention to provide an improved dual gauge wheel arrangement for a row crop cultivator.

It is another object of the present invention to provide close spacing between a pair of leading gauge wheels and a trailing, central coulter in a row unit for improved cutting, reducing and clearing of crop residue, weeds and debris as the row unit traverses a field.

Yet another object of the present invention is to provide a narrow, V-shaped gauge wheel profile in a row crop cultivator to permit the gauge wheels to operate in the center of the valley between adjacent crop row ridges without pushing down the sloped sides of the ridges or running over crop roots or tearing leaves, and having a reduced tendency to form furrows.

A further object of the present invention to allow for the use of two larger diameter, narrower gauge wheels in a row unit while maintaining a solid wall in the lower front quadrant, just above the location at which the gauge wheels engage the soil (and residue), and the location at which a trailing coulter enters the soil for improved cutting of crop residue.

This invention contemplates an inter-row crop cultivator, planter or fertilizer applicator row unit for use with a toolbar drawn by a traction vehicle, the row unit comprising: a frame mounted to the toolbar; first and second gauge wheels attached to the frame in side-by-side alignment and adapted to ride on the surface of the soil in use, wherein each of the gauge wheels is inclined inwardly toward the other gauge wheel while proceeding toward respective forward and lower portions of the gauge wheels (i.e., the seven o'clock position mentioned above) such that lower, forward portions of the first and second gauge wheels firmly contact each other, thereby creating a continuous tread to engage the ground and causing the gauge wheels to rotate in unison, and wherein aft portions of the first and second gauge wheels are laterally spaced from one another (at the one o'clock position); and a soil-engaging coulter attached to the frame and disposed centrally between the gauge wheels, such that the location at which the coulter enters the soil is disposed adjacent the location at which the gauge wheels engage the ground and forward of the locations where the gauge wheels leave the soil as the gauge wheels rotate during operation.

BRIEF DESCRIPTION OF THE DRAWINGS

The appended claims set forth those novel features which characterize the invention. However, the invention itself, as well as further objects and advantages thereof, will best be understood by reference to the following detailed description of exemplary embodiments taken in conjunction with the accompanying drawings, where like reference characters identify like elements throughout the various figures, in which:

FIG. 1 is a side elevation view shown partially in phantom of a row crop cultivator incorporating a gauge wheel arrangement in accordance with the principles of the present invention;

FIG. 2 is a front elevation view of the inventive row crop cultivator shown in FIG. 1;

FIG. 3 is a horizontal sectional view of the row crop cultivator shown in FIG. 1 taken along sight line 3—3 therein;

FIG. 4 is a side elevation view of a right side gauge wheel used in the present invention;

FIG. 5 is a front elevation view of the gauge wheel shown in FIG. 4;

FIG. 9 is a plan view shown partially in phantom of a mounting bracket for attaching a gauge wheel to a row crop cultivator in accordance with the present invention;

FIG. 10 is a side elevation view of a mounting bracket for attaching a gauge wheel to a row crop cultivator in accordance with the present invention;

FIG. 11 is a front elevational view of a planter row unit incorporating the inventive gauge wheel/coulter arrangement;

FIG. 12 is a left side view of the planter row unit of FIG. 11; and

FIG. 13 is a plan view of the planter row unit of FIG. 11.

DETAILED DESCRIPTION OF THE PREFERRED EMBODIMENT

Figure 8:
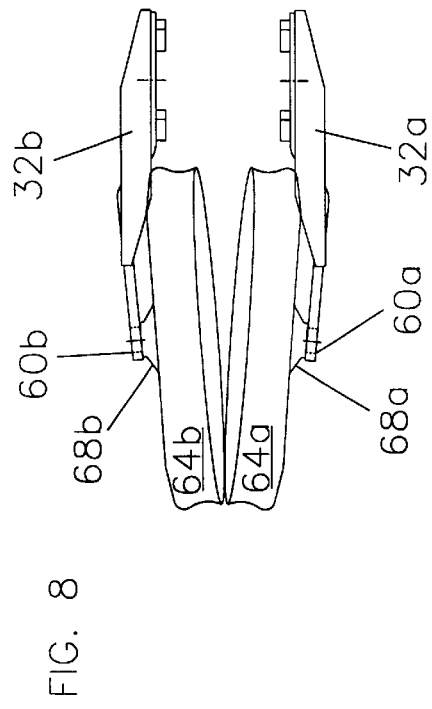
FIG. 8 is a plan view of the pair of gauge wheels and mounting brackets shown in FIG. 7.

Referring to FIG. 1, there is shown partially in phantom a side elevation view of a row unit 10 incorporating a gauge wheel/coulter arrangement in accordance with the present invention. A front elevation view of the row unit 10 is shown in FIG. 2, while FIG. 3 is a horizontal sectional view of the row unit shown in FIG. 1 taken along sight line 3—3 therein.

Row unit 10 includes first and second vertically aligned brackets 14a and 14b which are connected together by means of lower and upper cross frame members 28 and 30. The combination of paired angle plates and cross members is securely mounted to an agricultural implement toolbar 12 in the form of a tube having a generally square or rectangular cross section by conventional left and right four-bar linkages 15, 17. A conventional mounting arrangement for attaching the paired mounting plates and cross members to toolbar 12 would typically include threaded U-shaped bolts and mounting nuts which are not shown in the drawing for simplicity.

The forward ends of left and right upper linkage bars 16a and 16b are pivotally attached to respective upper portions of the first and second vertically aligned mounting brackets 14a, 14b. The forward ends of left and right lower linkage bars 18a and 18b are pivotally connected to respective lower portions of the first and second vertically aligned bars 14a, 14b. The rear ends of links 16a, 16b are pivotally connected to first and second mast plates 26a and 26b which are part of the row unit frame. Similarly, the rear ends of the lower links 18a, 18b are also pivotally connected respectively to the first and second mast plates 26a, 26b on the row unit frame. Each linkage bar is coupled to a respective vertically aligned mounting bracket and mast plate by means of a nut and bolt combination as shown in the figures which allows the linkage bar to pivot in a vertical direction at both ends. The combination of upper and lower parallel linkage bars 16a, 18a and the first and second vertically aligned bracket 14a and first mast plate 26a forms a left four-bar linkage. A similar right four-bar linkage is formed on the right side of the unit connecting the unit frame to the toolbar. The two four-bar linkages permit the row unit to move vertically, independently of adjacent row units, while remaining laterally in place on the toolbar.

A coil spring 20 under tension is connected between the upper links 16a, 16b and a lower cross member 28 connecting the mounting brackets 14a, 14b. The tension applied across the tension spring 20 may be varied in a conventional manner (which is not shown in the figure for simplicity) to adjust the downward pressure applied to the row unit, as is known. A typical arrangement for adjusting the tension on spring 20 and the amount of weight transferred from the toolbar 12 to the row unit would include a sliding channel attached to an upper end of spring 20 which is movable by rotating a head on the end of a threaded rod which cooperates with the slide. Although only a single tension spring 20 is shown in the drawing, row unit 10 would typically incorporate two such tension springs arranged in a side-by-side manner. By attaching the bars 14a, 14b to toolbar 12, the row cultivator is pulled in the direction of arrow 22 when the toolbar is drawn in that direction by a traction vehicle (not shown).

Attached to an aft portion of the first and second mast plates 26a, 26b by conventional means such as nut and bolt combinations are first and second laterally spaced mounting brackets, or holders, 46a and 46b. Disposed between and coupled to the first and second mounting brackets 46a, 46b also by conventional means such as nut and bolt combinations is a generally vertically oriented shank 36. Shank 36 extends downwardly from aft portions of the first and second mounting brackets 46a, 46b and includes several ground engaging tools on its distal, or lower, end. Thus, disposed on a forward portion of the lower end of the shank 36 is a lead point 40. Disposed aft of lead point 40 and attached to respective sides of shank 36 are first and second lay shares 38a and 38b. Lead point 40 disposed on the forward, lower end portion of shank 36 has a width greater than that of the shank, and a shape which produces a downward force on the row unit 10 as the lead point is drawn through the soil. The spaced lay shares 38a and 38b also travel through the soil under normal conditions and serve to loosen and turn the top soil and mix it with crop residue as well as to sever the roots of inter-row vegetation. In FIG. 1, the soil surface is shown as dotted line 35, with the lead point 40 and lay share combination shown traveling through the soil below the soil surface in the use position.

Also attached to and extending downwardly from the first and second mast plates 26a, 26b are a pair of support legs, only one of which is shown as element 50 in FIG. 1. Each of the support legs 50 is attached to a circular coulter blade 44 by means of an axle 56 and a hub, as shown at 57 in FIG. 1. Coulter 44 extends downwardly into the soil and is freely rotatable about axle 56 as the row unit 10 is drawn through a field. Coulter 44 is provided with a sharp peripheral edge for cutting and severing crop residue, vines and weeds between adjacent crop rows. The depth of the coulter blade 44 in the soil may be adjusted as desired by inserting axle 56 in an appropriate set of aligned apertures 58 formed in the pair of spaced support legs 50.

Also attached to the support legs 50 by means of first and second mounting brackets or wheel arms 32a and 32b are first and second gauge wheels 34a and 34b, respectively. The gauge wheels 34a, 34b ride on the soil surface 35 as shown in FIG. 1 and they are mounted on intersecting axes. Thus, the left gauge wheel 34a is freely rotatable about a first axle 60a, while the second gauge wheel 34b is freely rotatable about a second axle 60b. Each of the axles 60a, 60b are inclined with the horizontal and the vertical to intersect at a central location which is above and to the rear of a horizontal transverse line through the respective centers of the gauge wheels. Thus, the gauge wheels provide a "toed-in" configuration as described in greater detail below.

The mounting brackets 32a, 32b are securely mounted to the support legs 50 by means of a nut and bolt combination 52 which is inserted through an elongated slot 54 in each of the support legs. The elongated slot 54 in each of the support legs 50 allows the mounting brackets and gauge wheel combinations to be adjusted vertically to permit the running depth of the ground working tools 40, 38a and 38b to be adjusted as desired. A pair of compression springs, only one of which is shown as element 24 in FIG. 1, are attached to the pair of mounting brackets 46a and 46b mounted to an aft, lower portion of the first and second mast plates 26a and 26b. Compression springs 24 permit the shank 36 and the ground working tools attached to the lower end thereof to deflect vertically a predetermined distance in the event an implement encounters an obstruction such as a rock in the soil. Upward deflection of the shank 36 upon encountering an obstruction allows the point 40 and first and second lay shares 38a, 38b to ride over the obstruction without damage. Each of the compression springs 24 engages a cross member disposed between the first and second mast plates 26a, 26b, while the combination of a cover plate 27 and an adjustment bolt 29 is attached to an upper end of the springs to permit adjustment of the downward force applied to the shank 36 and implements attached thereto.

Figure 6:
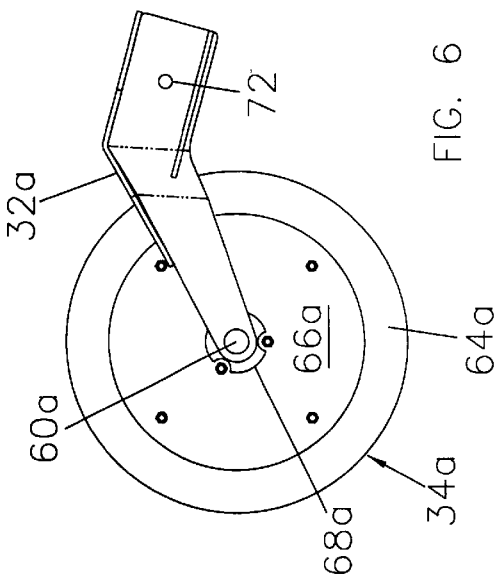
FIG. 6 is a side elevation view showing the manner in which a gauge wheel is mounted in a row crop cultivator in accordance with the present invention.

Referring also to FIGS. 4 and 5, there are respectively shown side and front elevation views of a gauge wheel 34a used in the gauge wheel arrangement of the present invention. Also with reference to FIGS. 6, 7 and 8 which are respectively side elevation, front elevation and top plan views of the inventive pair of gauge wheel and mounting bracket combinations, additional details of the invention will now be described.

Gauge wheel 34a includes a tire 64 preferably of the semi-pneumatic type having a large radius at the intersection of its outer side wall and its soil-engaging surface (see 64C in FIG. 5), a slightly concave profile 64d for soil engagement, and a sharp, or pointed corner on the outermost portion of its inner side wall. Tire 64 thus is characterized as having a flat inner surface 64a, a sharp or pointed inner edge 64b, a concave support surface 64d and a contoured outer corner 64c. The inner flat surface 64a of the tire is oriented generally vertical to the soil surface as the gauge wheel 34a traverses a field, but is inclined relative to a vertical surface extending in the direction of travel.

In one embodiment, tire 64 has a 16 inch outer diameter and a 2½ inches width and preferably less than 3 inches. The semi-pneumatic tire 64 is mounted on a rim assembly 66 preferably comprised of steel or a combination of steel and plastic. A sealed bearing 68 is captured between the inner and outer rims and includes an aperture 70 for mounting the gauge wheel 34a to its mounting bracket 32a by means of first axle 60a. A similar construction and mounting arrangement is provided for the second gauge wheel 34b. Tires having the outer peripheral profile as shown in the various figures are commonly known as "chinned edge" tires. The arrangement of the first and second gauge wheels 34a, 34b with intersecting axes and each having a chinned edge outer periphery provides a generally flat contour of the soil-engaging surface of the combined tires as illustrated by the corresponding soil contour 37 at the bottom of FIG. 7. The wedge-shaped front profile of the first and second gauge wheels 34a, 34b, which is described in greater detail below, also provides, in the case of a cultivator, improved performance in certain tillage practices such as in "ridge tilling" because this narrow profile allows the gauge wheels to operate in the center of the valley between adjacent crop row ridges without pushing down (i.e., collapsing) the sloped sides of the facing ridges.

With reference also to FIGS. 9 and 10, which are respectively plan and side elevation views of gauge wheel mounting bracket 32a, additional details of the invention will now be described. Gauge wheel mounting bracket 32a is bent in areas 76a and 76b to form a compound angle (i.e., the axis of rotation of said gauge wheel is inclined rearwardly and upwardly when proceeding from the outer side of the wheel to the center between the wheels). In forming this compound angle, mounting bracket 32a is bent inwardly at area 76b so that the forward ends of a pair of mounting brackets are spaced closer than the aft ends of the brackets. Mounting bracket 32a is similarly bent at area 76a so that the lower portions of the gauge wheels mounted to a pair of spaced mounting brackets are closer than the upper portions of the gauge wheels. This relationship between the first and second gauge wheels 32a and 32b is shown in the various figures and results in an extended area of firm contact between forward, lower portions of the two gauge wheels (i.e., approximately the seven to eight o'clock position when viewing the left gauge wheel from the left side). The contact is firm in the sense that the tires are forced together so that they deform slightly and form a solid wall which will bear the weight and not permit debris to enter between the edges of the tire in the region of contact. This area of contact between gauge wheels 32a and 32b subtends an arc designated α in FIG. 1. The arc of contact is in the range of 30°–60° and may be 45°, with the mid-point of the range being approximately midway between the six o'clock and nine o'clock position, i.e., 45° below horizontal.

Figure 7:
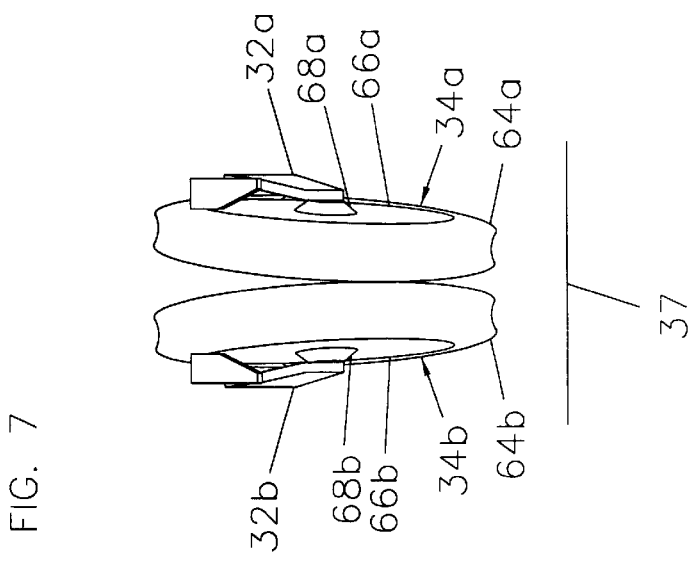
FIG. 7 is a front elevation view of a pair of gauge wheels as well as their respective mounting brackets disposed in a row crop cultivator in accordance with the present invention.

Extended, firm contact between the first and second gauge wheels 32a, 32b in their respective lower, forward quadrants creates a frictional engagement between the wheels and causes the two gauge wheels to rotate in unison as the row unit 10 is drawn through a field. Further, the extended contact between the tires creates a solid front wall which engages and flattens upstanding residue, and it prevents residue from entering between the wheels and plugging, as in the prior art. With the forward, lower portions of the gauge wheels 34a, 34b in contact, the trailing or aft portions of the two gauge wheels are in laterally spaced relation to one another as shown in FIGS. 3 and 7. The area of contact between the first and second gauge wheels 34a, 34b extends from a point slightly below their horizontal center lines in the front portions of each of the wheels (the eight o'clock position as viewed from the left side) downward to a point near where the tires contact the soil surface 35 (the seven o'clock position).

Disposed between the spaced aft portions of the first and second gauge wheels 34a, 34b is the coulter 44. Coulter 44, positioned centrally between the first and second gauge wheels 34a, 34b, is disposed as far forward as possible without contacting either of the gauge wheels, and is mounted so as to extend below the gauge wheels to cut a slit in the soil and to sever residue held by the gauge wheels.

As seen in FIG. 1, the hub 57 of the coulter can now extend between the gauge wheels because their rear portions are spaced apart. This is made possible while maintaining the same overall width of coulter and gauge wheels as in prior units, because the wheels may be more narrow. Yet the combined wheels, when construed and arranged as disclosed, provide sufficient flotation or load-bearing capacity, especially because of their larger diameter. Further, the point at which the coulter blade 44 enters the soil is located in the region where the gauge wheels 34a, 34b contact the soil, preferably the soil entry point of the coulter blade is disposed at a location where both gauge wheels contact the ground. That is, cutting of residue takes place while the gauge wheels hold, secure and tension the residue. There are a number of advantages to this gauge wheel/coulter blade arrangement. First, by moving the coulter forward so that its soil-entry point is next to where the wheels contact, the ground allows the gauge wheels to engage and pin crop residue, vines and weeds in place against the ground as the coulter passes over and cuts the residue. Cutting residue as it is securely held in place on the soil by the gauge wheels more effectively severs the residue so that it does not "hair pin" around the shank of the sweep and plug its action. Cutting efficiency is further increased by the divergence of the two gauge wheels which results in the application of a pulling or separating force exerted on the crop residue which is thus held under tension as it is cut. Another advantage of this arrangement is that the wedge-shaped shaped front profile of the pair of gauge wheels, narrowed by having the wheels contact each other, allows the gauge wheels to more gently deflect the leaves of plants in the adjacent crop rows out of the path of the moving cultivator without running over plant leaves or roots and cutting or otherwise damaging the growing plants. Further, because the tires engage to form a solid tread of double width in the lower front quarter of the wheels, there is little or no chance for residue to get pinched between the wheels and moved to the rear or plug the unit.

Shown in FIG. 1 in dotted line form is a typical prior art gauge wheel 33 of smaller diameter than the instant wheels 34a, 34b. The center, or axle, of the prior art gauge wheel 33 is identified as element 62 in the figure. Prior art approaches employing a single gauge wheel require placing the coulter blade 44 completely behind the wheel so that the gauge wheel and coulter blade do not contact. Some paired gauge wheels in the prior art are mounted to a single axle 62 and are arranged side-by-side. The use of a single axle 62 prevents closer spacing between the prior art gauge wheels 33 and the coulter blade 44 which limits the effectiveness of the coulter blade in cutting residue, vines and weeds. From FIG. 1, it can be seen that coulter blade 44 may be moved substantially closer to the paired gauge wheels of the present invention than could be accomplished in prior art gauge wheel/coulter blade arrangements in which the wheels are mounted on a single axis. From FIG. 1, it can also be seen that the gauge wheels of the present invention have a radius "X" which is greater than the radius of "Y" of the prior art gauge wheels 33. The inventive gauge wheel/coulter arrangement of the present invention thus allows for the use of larger diameter gauge wheels which more easily traverse large obstructions in the field such as rocks. In addition, by increasing the diameter and circumference of the gauge wheels, the width of the gauge wheel may be correspondingly reduced while still maintaining the same tire track area (which provides the flotation or load-bearing capacity of the wheels) on the surface of the soil. Reducing the width of the pair of side-by-side gauge wheels allows for a more narrow profile of the gauge wheel combination which facilitates working between closely spaced crop rows and reduces the likelihood of plant damage. It also allows the rear of the wheels to be further separated, for a given overall width, thus permitting the coulter to be placed in a more forward position without having the tires rub against the hubs of the coulter.

There has thus been shown a gauge wheel arrangement for an agricultural implement which is particularly adapted for use in a row unit mounted on an implement frame or toolbar. The gauge wheel arrangement includes a pair of closely spaced, narrow, ground-engaging wheel assemblies arranged in side-by-side but rearwardly diverging relation, with the gauge wheels angled inwardly toward one another at the forward and lower portions thereof so that the wheels engage each other as they rotate when drawn through a field. This contact area is on forward portions of the two gauge wheels and extends from a point at or below the horizontal center lines of the two wheel assemblies downwardly and rearwardly to a point near where the two wheel assemblies engage the ground. Forward motion of the row unit causes the gauge wheels to rotate in unison. A circular coulter blade is disposed in closely spaced relation just aft of and intermediate the rear, diverging portions of the two gauge wheels and bisects the angle between the wheel assemblies. A leading, lower edge portion of the coulter blade engages the soil within the soil contact area of the pair of gauge wheels. Thus, depth gauging is accomplished immediately adjacent the coulter, and is more accurate than those systems which have a single gauge wheel located in front of the coulter. The inwardly angled gauge wheels provide a narrow, wedge-shaped front profile to avoid row crop damage and prevent residue buildup, while the trailing coulter blade cuts vines, weeds and crop residue as they are held down on the surface of the soil by the two gauge wheel assemblies. Positioning the trailing coulter blade between the aft, spaced portions of the two gauge wheels allows for close positioning of the ground engaging portions of the gauge wheels assemblies and coulter blade, provides a support footprint equivalent to that of a single, wide gauge wheel for improved cultivator support, and allows for a large circumference of the gauge wheel assembly while maintaining close spacing between the gauge wheel assemblies and the cutting coulter blade. The larger diameter gauge wheels facilitate traversal of mounds of residue and cutting through the residue without pushing or "bulldozing" the residue.

Turning now to FIGS. 11–13, there is shown an embodiment of a planter row unit generally designated 100 which incorporates the present invention. The planter row unit 100 is mounted to an implement frame or toolbar 101 by means of conventional U-bolts 106 by a conventional four-bar linkage 102 comprising left and right individual four-bar linkages generally designated 103, 104, respectively, in FIG. 13. The planter row unit moves to the left as seen in FIGS. 12 and 13, when in use.

The planter row unit 100 includes a frame 105 in FIG. 12, which carries a seed hopper 107. A pair of furrow-opening discs, 110 and 111 (FIG. 11) and a pair of depth gauge wheels, 112, 113 are mounted to the lower section of the frame 105, according to conventional design. A pair of upwardly-diverging furrow-closing wheels 115, 116 (FIG. 13) are mounted to the rear of frame 105, and they straddle the furrow formed by the opener and close it while slightly compacting soil around the seeds deposited in the furrow.

As is known, seed is stored in the hopper 107 and fed through and "singulated" by a meter (not shown) located beneath the hopper 107. After the seed is isolated and properly spaced, it is deposited at a desired spacing in a furrow formed by the double-disc opener 110, 111 and cooperating gauge wheels 112, 113. Following placement of the seed, the inclined furrow-closing wheels 115, 116 cover the seed, close the furrow and slightly compact soil over the seed.

In a widespread current farming practice, crop residue remains on or near the surface of the soil during planting, left from the prior season's harvest. The leaving of surface residue is desired and believed to be beneficial. However, particularly in the case of corn, surface residue may make planting more difficult the following season, so it is desirable to cut and separate residue in a planter row unit. This is because the conventional twin-disc furrow opener, including the discs 110, 111, are not effective in cutting residue. Rather, heavier residue, particularly of the type found in corn crop residue, has a tendency to "hair pin" beneath the twin disc opener of a planter row unit, thereby interfering with the formation and depth control of the furrow being formed by the opener discs.

A gauge wheel/coulter assembly described above in connection with a cultivator row unit is generally designated by reference numeral 120 in the planter row unit of FIGS. 11–13. It includes left and right gauge wheels 121, 122 mounted by means of left and right wheel support arms 123, 124. The gauge wheel mounting arms 123, 124 are similar to those which already have been described in connection with the first embodiment. The gauge wheel support arms mount the wheels 121, 122 so that the front, lower quarter of the wheels engages as seen at 125 in FIG. 11. The wheels are inclined to diverge in a rearward, upward direction as described above, to receive a coulter 126. The coulter 126 is mounted to a support arm 127. The gauge wheel support arms 123 and 124 and the coulter support arm 127 are mounted to the lower forward section of the row unit frame 105 to extend downwardly and forwardly thereof, as seen in FIG. 12.

The structure of FIGS. 11–13 for mounting the gauge wheel/coulter assembly 120 to the planter row unit frame may be modified to include a pivotal mount for the gauge wheel mounting arms 123, 124 and the coulter support arm 127, together with a spring or other structure for providing a downward force while permitting the gauge wheel/coulter assembly to pivot upwardly in the event an obstruction is encountered which cannot be cut by the coulter 126.

While particular embodiments of the present invention have been shown and described, it will be obvious to those skilled in the art that changes and modifications may be made without departing from the invention in its broader aspects. For example, while the inventive gauge wheel arrangement is disclosed for use in a row unit, this invention may be used with other devices such as an anhydrous applicator. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

I claim:

1. In an agricultural row unit having a frame and adapted to be mounted to an implement, the combination comprising:

a coulter mounted to said row unit frame for rotation about a horizontal axis transverse of the direction of travel of said row unit; and first and second gauge wheels carried by said row unit frame for rotation about intersecting axes, the adjacent edges of said gauge wheels engaging each other respectively at a location in a lower front quadrant thereof and diverging from each other along a direction from said location of engagement proceeding upwardly and rearwardly thereof, said coulter being located between said gauge wheels, said gauge wheels engaging each other and engaging the ground and holding down residue adjacent the location at which said coulter enters the ground to cut residue.

2. The apparatus of claim 1 characterized in that said gauge wheels contact each other over a substantial portion of said lower front quadrant of said wheels.

3. The apparatus of claim 2 wherein said gauge wheels include semi-pneumatic tires and said inner edges of said gauge wheel tires engage each other over an arc defined by an included angle in the range of approximately 30–60°.

4. The apparatus of claim 3 wherein the region of engagement of said wheels is defined by an included angle of approximately 45° and the midpoint of said region of engagement is approximately 45° below horizontal.

5. The apparatus of claim 2 wherein said gauge wheels include semi-pneumatic tires and said inner edges of said gauge wheel tires engage each other over an arc defined by an included angle in the range of 30–60°, the midpoint of the region of engagement being at a location approximately 45° below a horizontal plane through the centers of said wheels and extending downwardly and rearwardly about the lower front quadrant of said wheels.

6. The apparatus of claim 5 wherein said included angle is approximately 45°.

7. The apparatus of claim 2 wherein each of said wheels has a diameter of at least 12 inches and wherein the width of said wheels is less than approximately 3 inches, the angle of divergence of said gauge wheels being such that the maximum overall width of said tires in the upper rear quadrant is less than approximately 12 inches.

8. The apparatus of claim 1 wherein said gauge wheels each include a semi-pneumatic tire having a ground-engaging surface which is concave in transverse section and has a sharp inner edge.

9. In an agricultural implement having a frame and adapted to be drawn by a tractor, the combination comprising:

a coulter carried by said frame for rotation about a horizontal axis transverse of the direction of travel of said implement; and first and second gauge wheels carried by said frame for rotation about intersecting axes, the adjacent edges of said gauge wheels firmly engaging each other respectively at a location in a lower first quadrant thereof and diverging from each other along the direction from said location of engagement proceeding upwardly and rearwardly thereof, said coulter being located between said gauge wheels, said gauge wheels engaging each other and engaging the ground and holding down residue adjacent the location at which said coulter enters the ground to cut residue.

10. The apparatus of claim 9 characterized in that said gauge wheels contact each other in firm engagement over a substantial portion of said lower front quadrant of said wheels and further characterized in that the contacting region of said wheels presents a profile of a single wheel for rolling over residue without permitting residue to enter into the space between said wheels adjacent the ground.

\* \* \* \* \*

UNITED STATES PATENT AND TRADEMARK OFFICE
CERTIFICATE OF CORRECTION

PATENT NO. : 6,325,156 B1
DATED : December 4, 2001
INVENTOR(S) : Alan F. Barry

It is certified that error appears in the above-identified patent and that said Letters Patent is hereby corrected as shown below:

<u>Title page,</u>
Item [57], ABSTRACT,
Line 2, after the word "unit" add -- is disclosed --

<u>Column 9,</u>
Line 38, delete second word "shaped".

Signed and Sealed this

Nineteenth Day of November, 2002

Attest:

JAMES E. ROGAN
Attesting Officer   Director of the United States Patent and Trademark Office